2,963,338

SILICON-CONTAINING AZO TRIAZINE DYES FOR DYEING GLASS FIBERS

Donald L. Bailey, Snyder, N.Y., and Ronald M. Pike, Chelmsford, Mass., assignors to Union Carbide Corporation, a corporation of New York No Drawing. Filed Aug. 25, 1959, Ser. No. 835,834

15 Claims. (Cl. 8—8)

This application is a continuation-in-part of S.N. 615,464 filed Oct. 12, 1956 and now abandoned.

This invention relates to organosilicon compounds and to processes for their production. More particularly, this invention is concerned with organosilicon compounds containing, among other functional groups, an iminoalkylsilyl group [—NH(CH$_2$)$_a$Si≡] and an iminoazo dyestuff group (—NHArN=N—) attached to a carbon atom of the triazine ring through the nitrogen atom of the imino group, as new compositions of matter. This invention is also concerned with processes for producing said organosilicon compounds and to uses thereof.

The present invention is based upon our discovery that silicon-containing azo triazine dyestuffs can be produced by reacting an aminoalkyl organosilicon compound and an aminoazo dyestuff with a cyanuric halide, such as cyanuric chloride or cyanuric bromide, to produce said silicon-containing azo triazine dyestuffs containing the group represented by the following formula:

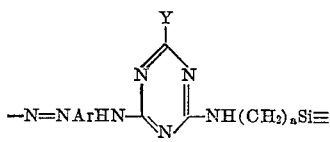

wherein $a$ is an integer of from 3 to about 10, preferably from 3 to about 5; Y represents a halogen atom such as chlorine or bromine, an amino radical, an hydroxyl radical, an arylimino radical such as anilino, an iminoazo dyestuff group or an iminoalkylsilyl group; and Ar represents an arylene radical, which, if desired, may contain other substituents on the ring.

According to our studies the reaction is a general one, and is applicable to all organosilicon compounds which contain the aminoalkylsilyl group represented by the formula:

$$H_2N(CH_2)_aSi\equiv$$

wherein $a$ is an integer of at least 3. Suitable for use in our process are the aminoalkylalkoxysilanes, the aminoalkylalkylsilanes and the aminoalkylpolysiloxanes, including copolymeric materials which contain both aminoalkylsiloxane and hydrocarbon siloxane units.

Typical of the aminoalkylalkoxysilane and aminoalkylalkylsilanes suitable for use as our organosilicon starting materials are those compounds represented by the structural formula:

wherein R' represents a hydrocarbon radical, for example, an alkyl group such as methyl, ethyl, propyl, butyl and the like, or an aryl group such as phenyl, naphthyl, tolyl and the like, or an aralkyl group such as benzyl and the like; X represents an alkoxy group such as methoxy, ethoxy, propoxy and the like; $a$ is an integer having a value of at least 3 and preferably a value of from 3 to 4; and $b$ is an integer having a value of from 0 to 3 and preferably a value of from 0 to 1. Illustrative of such compounds are gamma-aminopropyltriethoxysilane, gamma-aminopropylmethyldiethoxysilane, gamma-aminopropylethyldiethoxysilane, gamma - aminopropylphenyldiethoxysilane, gamma - aminopropyltrimethylsilane, gamma-aminopropylphenyldimethylsilane, delta-aminobutylmethyldiethoxysilane, delta - aminobutylethyldiethoxylsilane, delta-aminobutylphenyldiethoxysilane, omega - aminohexyltriethoxysilane, and the like.

Typical of the aminoalkylpolysiloxanes suitable for use as our organosilicon starting materials are those polysiloxanes which contain the structural unit:

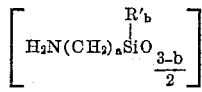

wherein R', $a$ and $b$ have the same values described above. Such polysiloxanes are prepared by the hydrolysis and condensation of those aminoalkylalkoxysilanes described above or by the cohydrolysis and co-condensation of such aminoalkylalkoxysilanes with other hydrolyzable silanes and can include: aminoalkylpolysiloxanes of the trifunctional variety (i.e., where $b=0$), aminoalkylalkyl- and aminoalkylarylpolysiloxanes of the difunctional variety which include cyclic or linear polysiloxanes (i.e., where $b=1$) and linear aminoalkyldialkyl-, aminoalkyldiaryl- and aminoalkylalkylaryl- disiloxanes of the mono-functional variety (i.e., where $b=2$) as well as mixtures of compounds produced by the cohydrolysis of difunctional and trifunctional aminoalkylsilanes.

Suitable starting aminoalkylpolysiloxanes of the trifunctional variety can be more specifically depicted as containing the structural unit:

wherein $a$ has the value previously described, Z represents an hydroxyl or alkoxy group and $c$ has an average value of from 0 to 1, and can be as high as 2; preferably $c$ has a value from 0.1 to 1. Aminoalkylpolysiloxanes of this variety which are essentially free of silicon-bonded alkoxy or hydroxyl groups (i.e., where $c=0$) can be prepared by the complete hydrolysis and the complete condensation of aminoalkyltrialkoxysilanes, whereas aminoalkylpolysiloxanes which contain silicon-bonded alkoxy groups can be prepared by the partial hydrolysis and complete condensation of the same starting silanes. On the other hand, aminoalkylpolysiloxanes which contain silicon-bonded hydroxyl groups can be prepared by the complete hydrolysis and partial condensation of the same aminoalkyltrialkoxysilanes. By way of illustration, a gamma-aminopropylpolysiloxane containing silicon-bonded ethoxy groups can be prepared by hydrolyzing gamma-aminopropyltriethoxysilane with an amount of water insufficient to react with all of the silicon-bonded ethoxy groups present on the starting silane and subsequently condensing the hydrolyzates so formed to produce the desired polymer.

Suitable starting aminoalkylpolysiloxanes of the difunctional variety, which include cyclic and linear polysiloxanes, can be more specifically defined by the structural formula:

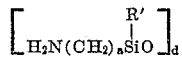

wherein R' and $a$ have the values previously described and $d$ is an integer having a value of at least 3 and can be as high as 7 for the cyclic aminoalkylsiloxanes and higher for the linear aminoalkylpolysiloxanes. Such cyclic and linear aminoalkylpolysiloxanes can be prepared by the hydrolysis and condensation of aminoalkylalkyl- or aminoalkylaryldiethoxysilanes. In carrying out the hydrolysis and condensation procedures, there is produced a product comprising a mixture of cyclic and linear polysiloxanes from which the desired polysiloxane can be recovered. Illustrative of the cyclic aminoalkylsiloxanes suitable for use as the organosilicon starting material in our process are the cyclic tetramer of gamma-aminopropylmethylsiloxane, the cyclic tetramer of delta-aminobutylphenylsiloxane, and the like. Illustrative of suitable linear aminoalkylpolysiloxanes are gamma-aminopropylmethylpolysiloxane, gamma-aminopropylethylpolysiloxane, delta-aminobutylmethylpolysiloxane, and the like.

Included among the useful starting linear aminoalkylpolysiloxanes are the alkyl, alkoxy and hydroxyl endblocked polysiloxanes which contain from 1 to 3 of such groups bonded to the terminal silicon atoms of the molecules comprising the polymeric chains. Thus we can also employ as our starting materials such linear endblocked aminoalkylpolysiloxanes as monoethoxy endblocked gamma-aminopropylethylpolysiloxane or methyldiethoxysilyl end-block delta-aminobutylmethylpolysiloxane or monoethoxydimethylsilyl end-blocked gamma-aminopropylphenylpolysiloxane and the like. The endblocked linear aminoalkylalkyl- and aminoalkylarylpolysiloxanes useful in our process can be prepared by the equilibration of cyclic aminoalkylsiloxanes with silicon compounds containing predominantly silicon-bonded alkoxy groups, or by the co-hydrolysis and condensation of trialkylalkoxysilanes with aminoalkylalkyl- or aminoalkylaryldiethoxysilanes. Hydroxy end-block linear polysiloxanes can be prepared by heating linear or cyclic aminoalkylpolysiloxanes with water.

The copolymeric aminoalkylpolysiloxanes which can be employed as starting materials can be depicted as containing both of the structural units:

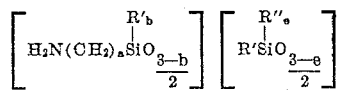

wherein R', a and b have the values described above, R" represents an alkyl or aryl group and e is an integer having a value of from 0 to 2. Our copolymers can be mixtures of trifunctional aminoalkylsiloxane units (where b=0) with trifunctional alkyl-, aryl- or mixed alkyl- and arylsiloxane units (where e=0) or with difunctional alkyl, aryl- or mixed alkyl- and arylsiloxane units (where e=1). They can also include mixtures of difunctional aminoalkylsiloxane units (where b=1) with trifunctional alkyl-, aryl- or mixed alkyl- and arylsiloxane units (where e=0) or with difunctional alkyl-, aryl- or mixed alkyl- and arylsiloxane units (where e=1).

Those copolymers which contain trifunctional aminoalkylsiloxane units and other siloxane units are preferably prepared by the co-hydrolysis and co-condensation of the corresponding alkoxysilane starting materials. Such copolymers can contain silicon-bonded hydroxyl or alkoxy groups or they can comprise essentially completely condensed materials. The linear copolymeric siloxanes are preferably prepared by the separate hydrolysis and condensation of an aminoalkylalkyl- or aminoalkylaryldialkoxysilane and the dialkyl- or diaryldialkoxysilane to cyclic aminoalkylsiloxanes and cyclic dialkyl- or diarylsiloxanes and subsequently equilibrating mixtures of such cyclic siloxanes to linear copolymers. Such linear copolymers can also contain chain-terminating or end-blocking groups such as alkyl, alkoxyl or hydroxyl groups. The equilibration will also produce some copolymeric cyclic siloxanes.

The aminoalkylalkoxysilanes and aminoalkylpolysiloxanes as well as copolymers containing aminoalkylsiloxanes and hydrocarbon siloxane units are all disclosed and claimed as new compositions of matter in co-pending U.S. applications Serial Nos. 615,466, 615,481, 615,483 and 615,507 filed October 12, 1956. Processes for producing such compounds are also disclosed and claimed in said co-pending applications.

Our studies have also shown that the reaction is a general one in respect to the aminoazo dyestuffs which can be used as one of the starting materials in our invention. Typical of the aminoazo dyestuffs suitable for use as starting materials are those compounds represented by the structural formula:

$$Ar'N=NArNH_2$$

wherein Ar represents an arylene radical and Ar' represents an aryl radical, both of which may, if desired, contain other substituents on the ring. The aryl and arylene radicals may represent members from the benzene series, the naphthalene series, the biphenylene series, and the like. The substituents on said aryl and arylene radicals may be alkyl radicals such as methyl or ethyl; alkoxy radicals such as methoxy or ethoxy, and radicals such as phenyl radicals, nitro radicals, sulfonic acid radicals, halogen atoms such as chlorine or fluorine, acetamino radicals, arylazo radicals such as phenylazo or tolylazo, hydroxyl radicals, carboxyl radicals, haloalkyl radicals such as chloromethyl or dichloroethyl, and the like. From among the many methods suitable, the aminoazo dyestuffs may be prepared by diazotizing a primary arylamine in a cold aqueous acid solution by methods well known in the dyestuff art and coupling said diazotized primary arylamine with an arylamine by means also well known in dyestuff technology.

Typical of the aminoazo dyestuffs suitable for use as our starting materials are:

4-amino-1:1'-azobenzene,
4-amino-4'-hydroxy-1:1'-azobenzene-3'-carboxylic acid,
4 - amino - 4' - hydroxy-5'-methyl-1:1'-azobenzene-3'-carboxylic acid,
4 - amino - 4' - hydroxy-2'-methyl-1:1'-azobenzene-3'-carboxylic acid,
4 - amino - 2 - methyl-4'-hydroxy-1:1'-azobenzene-3'-carboxylic acid,
4-amino - 2 - methoxy-4'-hydroxy-1:1'-azobenzene-3'-carboxylic acid,
4 - amino - 2 - chloro-4'-hydroxy-1:1'-azobenzene-3'-carboxylic acid,
4 - amino - 3 - methyl-5-methoxy-4'-hydroxy-1:1'-azobenzene-3'-carboxylic acid,
4 - amino-2-methyl-5-methoxy-2'-methyl-4'-hydroxy-1:1'-azobenzene-3'-carboxylic acid,
4 - amino - 4'-hydroxy-1:1'-azobenzene-3'-carboxy-5'-sulfonic acid,
2 - (2'-methyl-4'-aminophenylazo)-naphthalene-6,8-disulfonic acid,
1 - (2' - methyl - 4' - amino - 5'-methoxyphenylazo)-8-hydroxynaphthalene-3,6-disulfonic acid,
2-(4'-aminophenylazo)-naphthalene-6,8-disulfonic acid, and the like.

The overall reaction of cyanuric halides with starting aminoalkyl silicone compounds to produce completely substituted compounds is a stepwise reaction. In most instances, the first halogen atom of the cyanuric halide is replaced by an aminoalkyl silicon compound at a temperature of about 0° C.; the second halogen atom is replaced at about 30° C. to about 60° C.; and the third chlorine atom is replaced at about 90° C. or above. Thus three moles of amino compounds can be reacted with one mole of cyanuric halide. It is known that the basic character of the amino group in aromatic amines is weakened by the presence of negative groups, such as sulfo groups, and that such negative-group substituted amino compounds will not replace the third halogen atom. Therefore, compounds such as the aminoazo dyestuffs generally react with either the first or second halogen atom of the cyanuric halide and not with the third halogen atom.

For each mole of halogen on the cyanuric halide which is reacted with an amino group of our starting amines there is liberated one mole of a hydrohalic acid. The reaction proceeds at a faster rate when the hydrohalic acid is removed from the reaction zone by the addition of an acid acceptor to the reaction mixture. Suitable acid acceptors are the organic amines such as pyridine, triethylamine, and the like which do not contain active hydrogen atoms on the nitrogen atom; and the inorganic basis such as sodium carbonate, sodium bicarbonate, sodium hydroxide, and the like. We prefer to use a molar equivalent of acid acceptor per mole of halogen atom being reacted; however, larger or smaller amounts may also be used.

The silicon-containing azo triazine dyestuffs of this invention can be produced by reacting a molar equivalent of an aminoalkyl silicon compound with the first chlorine atom of the cyanuric halide at about 0° C.; then at about 30° C. to about 50° C. one mole of an aminoazo dyestuff is reacted with the primary condensation product obtained above to produce a secondary condensation product. This secondary condensation product may then be reacted at about 90° C. with water, ammonia, a primary amine such as aniline or ethylamine, or a second mole of aminoalkyl silicon compound to produce a tertiary condensation product. When water is used as one of the reactants to replace a halogen atom and the aminoalkylsilicon compound contains functional alkoxy groups some hydrolysis will occur and the product will be a siloxane.

The identical silicon-containing azo triazine dyestuffs may be produced by varying the order of reacting the starting amino materials with the cyanuric halide. For example, the first halogen atom may be replaced with one mole of an aminoazo dyestuff; the second halogen atom may then be replaced with an aminoalkyl silicon compound; and the third chlorine atom may then be reacted with water, ammonia, a primary amine, or an aminoalkylsilicon compound. By varying the reaction sequence and the starting materials it is possible to produce organosilicon azo triazine dyestuffs having many different structures. For example, a product containing two iminoazo dyestuff groups and one iminoalkylsilyl group can be produced by reacting the first two halogen atoms of the cyanuric halide with two moles of aminoazo dyestuffs and then reacting the third halogen atom with one mole of aminoalkyl silicon compound. Thus, for instance, it is possible to produce compounds having (I) one iminoalkylsilyl group [—NH(CH$_2$)$_a$Si≡] and one iminoazo dyestuff group (—NHArN=N—) attached to the carbon atoms of the triazine ring; or (II) iminoalkylsilyl groups and one iminoazo dyestuff group attached to the carbon atoms of the triazine ring; or (III) one iminoalkylsilyl group and two iminoazo dyestuff groups attached to the carbon atoms of the triazine ring by means of the nitrogen atom of the imino group.

We prefer to conduct the reaction in the presence of an inert gas and in a liquid solvent which is substantially non-reactive with our starting materials at the reaction temperatures employed. Preferably an anhydrous organic solvent is used, but water can also be included among the suitable solvents. Among the liquid organic compounds suitable are benzene, toluene, diethyl ether, petroleum ether, carbon tetrachloride, acetone, and the like.

The azo group can also be introduced into the compounds of this invention by reacting one or two of the halogen atoms of the cyanuric halide with compounds such as 1-amino-8-hydroxynaphthalene-3,6-disulfonic acid and then coupling into the naphthalene ring attached to the triazine ring with a diazonium salt at the position ortho to the hydroxyl group by means well known in dyestuff technology.

One method of conducting the reaction between our starting materials is to add a solution comprising a molar equivalent of the aminoalkyl silicon compound to a solution of the cyanuric halide at about 0° C. After the formation of the primary condensation product is complete, a solution comprising a molar equivalent of the aminoazo dyestuff may be added and the secondary condensation product is produced at about 30° C. to about 50° C. Then, if desired, a second molar equivalent portion of aminoalkyl silicon compound is added and the reaction is completed at about 90° C. to produce the tertiary condensation product.

The monomeric organosilicon compounds of this invention which contain both iminoalkylsilyl groups and iminoazo dyestuff groups can be represented by the following formula:

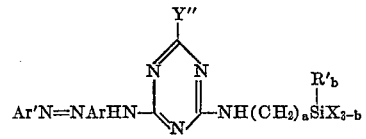

wherein Ar', Ar, X, R', $a$ and $b$ have the same meanings as hereinbefore indicated; and Y'' represents a halogen atom, an amino radical, an hydroxyl radical, an arylimino radical, an —NHArN=NAr' radical, or an

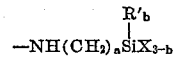

radical.

The polymeric silicon-containing azo triazine dyestuffs produced in this invention are the siloxane polymers containing units represented by the formula:

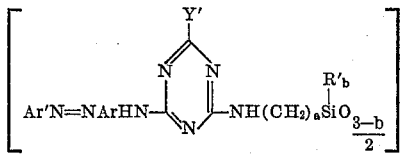

and siloxane copolymers containing units represented by the following formulae:

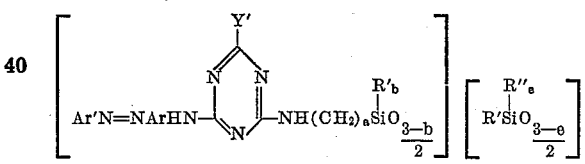

wherein Ar', Ar, R', R'', $a$, $b$ and $e$ have the same meanings as described above, Y' represents a halogen atom, amino radical, hydroxyl radical, arylimino radical, —NHArN=NAr' radical or

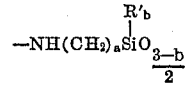

radical; and wherein the polymeric siloxane compounds may contain alkoxy or hydroxyl groups bonded to some of the silicon atoms.

The novel monomeric and polymeric compounds produced by the process of the present invention are useful as dyestuffs for wool, viscose, silk, cotton, acetate, nylon, glass and acrylonitrile fibers. They are also useful as intermediates in the production of inherently colored siloxane-modified melamine type resins, which can be used as coatings and molding compositions.

The following examples further serve to illustrate this invention.

*Example 1*

One mole of diazotized para toluidine was coupled in a weakly acidic to neutral aqueous medium to one mole of orthotoluidine to produce 4-methyl-3'-methyl-4'-amino-1:1-azobenzene. Five grams of the resulting mono-azo dyestuff was dissolved in 100 ml. of diethyl ether and gradually added, while vigorously stirring, to a flask containing 6 grams of 2-(3-triethoxysilylpropylimino)-4,6-dichlorotriazine dissolved in 50 ml. of diethyl ether. The primary condensation product, 2-(3-triethoxysilylpropylimino)-4,6-dichlorotriazine, was prepared by slowly adding, over a one-half hour period at about 0° C., a solution of one molar equivalent of gamma-aminopropyltriethoxysilane and one molar equivalent of triethylamine dissolved in diethyl ether to a diethyl ether solution of one molar equivalent of cyanuric chloride and stirring to allow the reaction to proceed to completion. The primary condensation product was then recovered by filtering to remove the insoluble triethylamine hydrochloride and vacuum distilling at a pressure of about 0.6 mm. of mercury at a temperature of 175° C. to 185° C. The ether solution of the aminoazo dyestuff was added to the ether solution of the primary condensation product at from about 30° C. to about 40° C. under an argon atmosphere. A molar equivalent of triethylamine was used as acid acceptor. After the addition was completed the mixture was stirred for about four hours and then filtered to remove a small amount of precipitate. The ether was distilled off at reduced pressure leaving as a residue 12 grams of a deep dark red solid. This was dissolved in 75 ml. of acetone, filtered and the acetone was distilled off at room temperature under reduced pressure. The yield of 2-chloro-4-(gamma - triethoxysilylpropylimino) - 6-(4'-p-tolylazo-2'-methylphenylimino)-triazine obtained was 6.7 grams; this solid had a metallic luster. The silicon-containing azo triazine dyestuff can be represented by the formula:

(IV) 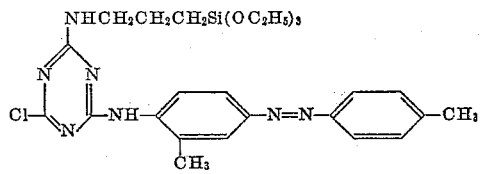

The chlorine atom may be replaced with an amino compound, such as aniline, or with ammonia, by stirring a solution of the above dyestuff, the amine and an acid acceptor, such as sodium bicarbonate or an excess of the amine compound, at a temperature of from 80° C. to about 95° C., to produce a dyestuff, which in the case of aniline, can be represented by the formula:

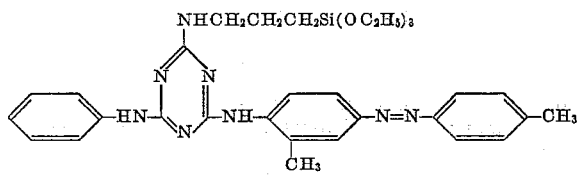

In the case where ammonia is used the product obtained would contain an amino group rather than an anilino group. Similarly the chlorine atom of compound (IV) may be replaced by gamma-aminopropyltriethoxysilane to produce a product having two gamma-triethoxysilylpropylimino groups, which can be represented by the formula:

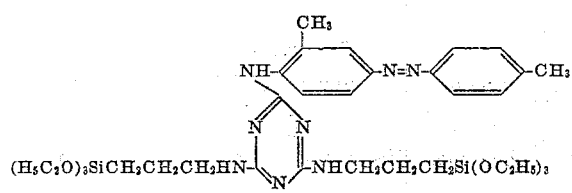

Similar products are produced by substituting other aminoazo dyestuffs in place of 2-methyl-4-(4'-methylphenylazo)-aniline. The reaction sequence can be varied by initially reacting one mole of the aminoazo dyestuff with one mole of cyanuric chloride and then reacting the produced product with the aminoalkyl silicon compound. By like procedures one can initially react the cyanuric chloride with two moles of aminoazo dyestuff and then with one mole of the aminoalkylsilicon compound. For example, the triazine dyestuff represented by the formula:

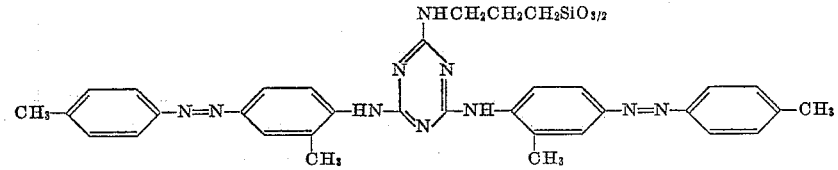

is produced by reacting one mole of the aminoazo dyestuff 2-methyl-4-(4'-methylphenylazo)-aniline at about 0° C. with one mole of cyanuric chloride, then reacting a second mole of said aminoazo dyestuff with the primary condensation product obtained at about 35° C. and finally reacting the disubstituted monochloro triazine with one mole of gamma-aminopropyltrichlorosilane at about 80° C. to about 95° C. in the presence of a small amount of water.

*Example II*

A dyebath was prepared consisting of one gram of 2-chloro-4-gamma-triethoxysilylpropylimino - 6-(4'-p-tolylazo-2'-methylphenylimino)-triazine in 50 ml. of methanol and 2 ml. of pyridine. The dyebath was a turbid suspension with only slight solubility of the dyestuff in the solvent. A test fabric, consisting of woven strips each about ¼ inch wide of wol, viscose, silk, cotton, acetate and nylon was inserted into the dyebath and allowed to stand overnight for about 15 hours at about 25° C. In addition, samples of glass cloth were also added. The fabric samples were then removed at the end of the test period, washed with water and dried. The fabrics were all dyed a yellow to yellow-orange shade. The dyeing can also be carried out from an aqueous dyebath at elevated temperatures, at about 95° C., in about one hour.

What is claimed is:

1. A triazine compound selected from the group consisting of silanes represented by the general formula:

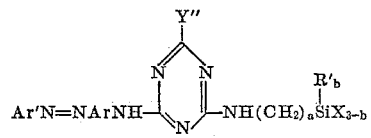

and siloxane polymers and copolymers containing the unit represented by the general formula:

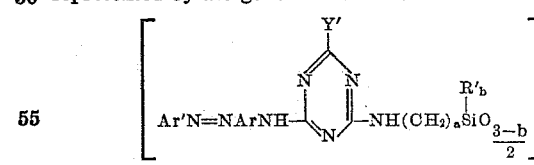

wherein Ar' represents a member selected from the group consisting of aryl radicals and substituted aryl radicals; Ar represents a member selected from the group consisting of arylene radicals and substituted arylene radicals; R' represents a member selected from the group consisting of alkyl radicals, aryl radicals and aralkyl radicals; X represents a member selected from the group consisting of lower alkoxy radicals; Y" represents a member selected from the group consisting of halogen atoms, amino radicals, hydroxyl radicals, arylamino radicals, $$—NHArN=NAr'$$

radicals and

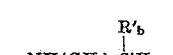

radicals; Y' represents a member selected from the group consisting of halogen atoms, amino radicals, hydroxyl radicals, arylamino radicals, —NHArN=NAr' radicals and $$-\text{NH}(\text{CH}_2)_a\overset{\overset{R'_b}{|}}{\text{SiO}}_{\frac{3-b}{2}}$$

radicals; (a) is an integer having a value of from 3 to about 10 and (b) is an integer having a value of from 0 to 3.

2. A triazine compound as claimed in claim 1, wherein (a) is an integer having a value of from 3 to about 5.

3. A silane as claimed in claim 1, wherein Y" represents a halogen atom and (a) is an integer having a value of from 3 to about 5.

4. A silane as claimed in claim 1, wherein Y" represents an amino radical and (a) is an integer having a value of from 3 to about 5.

5. A silane as claimed in claim 1, wherein Y" represents an $$-\text{NH}(\text{CH}_2)_a\overset{\overset{R'_b}{|}}{\text{SiX}}_{3-b}$$

radical and (a) is an integer having a value of from 3 to about 5.

6. A silane as claimed in claim 1, wherein Y" represents an —NHArN=NAr' radical and (a) is an integer having a value of from 3 to about 5.

7. A siloxane as claimed in claim 1, wherein Y' represents a halogen atom and (a) is an integer having a value of from 3 to about 5.

8. A siloxane as claimed in claim 1, wherein Y' represents an amino radical and (a) is an integer having a value of from 3 to about 5.

9. A siloxane as claimed in claim 1, wherein Y' represents an $$-\text{NH}(\text{CH}_2)_a\overset{\overset{R'_b}{|}}{\text{SiO}}_{\frac{3-b}{2}}$$

radical and (a) is an integer having a value of from 3 to about 5.

10. A siloxane as claimed in claim 1, wherein Y' represents an —NHArN=Ar' radical and (a) is an integer having a value of from 3 to about 5.

11. The silicon-containing azo triazine compound represented by the formula:

[triazine structure with NH(CH₂)₃Si(OC₂H₅)₃ substituent, Cl, NH—C₆H₃(CH₃)—N=N—C₆H₄—CH₃]

12. The silicon-containing azo triazine compounds containing units represented by the formula:

[triazine unit with NH(CH₂)₃SiO₃/₂ substituent, Cl, NH—C₆H₃(CH₃)—N=N—C₆H₄—CH₃]

13. The silicon-containing azo triazine compound containing units represented by the formula:

[triazine unit with NH(CH₂)₃SiO₃/₂ substituent, H₂N, NH—C₆H₃(CH₃)—N=N—C₆H₄—CH₃]

14. An article of manufacture comprising a fibrous material having a triazine dyestuff selected from the group consisting of silanes represented by the general formula:

$$\text{Ar'N}=\text{NArNH}-\underset{\text{triazine}}{\overset{Y''}{\diagup}}-\text{NH}(\text{CH}_2)_a\overset{\overset{R'_b}{|}}{\text{SiX}}_{3-b}$$

and siloxane polymers and copolymers containing the unit represented by the general formula:

$$\text{Ar'N}=\text{NArNH}-\underset{\text{triazine}}{\overset{Y'}{\diagup}}-\text{NH}(\text{CH}_2)_a\overset{\overset{R'_b}{|}}{\text{SiO}}_{\frac{3-b}{2}}$$

wherein Ar' represents a member selected from the group consisting of aryl radicals and substituted aryl radicals; Ar represents a member selected from the group consisting of arylene radicals and substituted arylene radicals; R' represents a member selected from the group consisting of alkyl radicals, aryl radicals and aralkyl radicals; X represents a member selected from the group consisting of lower alkoxy radicals; Y" represents a member selected from the group consisting of halogen atoms, amino radicals, hydroxyl radicals, arylamino radicals, —NHArN=NAr' radicals and $$-\text{NH}(\text{CH}_2)_a\overset{\overset{R'_b}{|}}{\text{SiX}}_{3-b}$$

radicals; Y' represents a member selected from the group consisting of halogen atoms, amino radicals, hydroxyl radicals, arylamino radicals, —NHArN=NAr' radicals and $$-\text{NH}(\text{CH}_2)_a\overset{\overset{R'_b}{|}}{\text{SiO}}_{\frac{3-b}{2}}$$

radicals; (a) is an integer having a value of from 3 to about 10 and (b) is an integer having a value of from 0 to 3, applied to said fibrous material.

15. An article of manufacture as claimed in claim 14, wherein the fibrous material comprises glass fibers.

References Cited in the file of this patent
UNITED STATES PATENTS

| 1,958,327 | Winkler | May 8, 1934 |
| 2,436,304 | Johannson | Feb. 17, 1948 |
| 2,715,133 | Speier | Aug. 9, 1955 |

OTHER REFERENCES

Jour. Organic Chemistry, vol. 18, January 1953, pp. 47, 48 and 54.

UNITED STATES PATENT OFFICE
CERTIFICATION OF CORRECTION

Patent No. 2,963,338            December 6, 1960

Donald L. Bailey et al.

It is hereby certified that error appears in the above numbered patent requiring correction and that the said Letters Patent should read as corrected below.

Column 3, lines 21 and 30, for "end-block" read -- end-blocked --; column 5, line 49, after "(II)" insert -- two --; column 8, line 31, for "wol" read -- wool --.

Signed and sealed this 16th day of May 1961.

(SEAL)
Attest:

ERNEST W. SWIDER            DAVID L. LADD
Attesting Officer            Commissioner of Patents